United States Patent
Huang et al.

(10) Patent No.: US 10,710,158 B2
(45) Date of Patent: Jul. 14, 2020

(54) SLURRY USED FOR A FOOD PACKAGING SUBSTANCE AND METHOD OF PREPARATION INCLUDING THE FOOD PACKAGING STRUCTURE AND SUBSTANCE

(71) Applicant: Tsung-Chih Huang, Zhubei, Hsinchu County (TW)

(72) Inventors: Tsung-Chih Huang, Zhubei (TW); Cheng-Sen Huang, Zhubei (TW)

(73) Assignee: Tsung-Chih Huang, Zhubei, Hsinchu County (TW)

(*) Notice: Subject to any disclaimer, the term of this patent is extended or adjusted under 35 U.S.C. 154(b) by 0 days.

(21) Appl. No.: 15/975,559

(22) Filed: May 9, 2018

(65) Prior Publication Data

US 2019/0344341 A1    Nov. 14, 2019

(51) Int. Cl.

| C08K 3/22 | (2006.01) |
|---|---|
| B22F 1/00 | (2006.01) |
| C08L 67/00 | (2006.01) |
| C08K 9/04 | (2006.01) |
| B65D 1/02 | (2006.01) |
| B65D 65/38 | (2006.01) |
| C08K 5/053 | (2006.01) |

(52) U.S. Cl.
CPC .......... *B22F 1/0074* (2013.01); *B22F 1/0011* (2013.01); *B22F 1/0081* (2013.01); *B65D 1/0207* (2013.01); *B65D 65/38* (2013.01); *C08K 3/22* (2013.01); *C08K 5/053* (2013.01); *C08K 9/04* (2013.01); *C08L 67/00* (2013.01); *C08K 2003/2258* (2013.01); *C08L 2203/30* (2013.01)

(58) Field of Classification Search
CPC combination set(s) only.
See application file for complete search history.

(56) References Cited

U.S. PATENT DOCUMENTS

2015/0110982 A1* 4/2015 Brannon ............... C08K 3/22
428/36.4

* cited by examiner

*Primary Examiner* — Monique R Peets
(74) *Attorney, Agent, or Firm* — Birch, Stewart, Kolasch & Birch, LLP (57) ABSTRACT

A slurry for making a food packaging substance includes ethylene glycol, DI water, and $W_{18}O_{49}$-based tungsten oxide particles having an average particle size of less than 100 nm. Based on 100 wt. % of the slurry, the $W_{18}O_{49}$-based tungsten oxide particles contain an amount of 18 wt. % to 28 wt. %. A method of preparing a slurry for making a food packaging substance is disclosed. This method includes a food packaging substance that includes the slurry. A food packaging substance is disclosed. A method for making the food packaging substance and a food packaging structure that includes the food packaging substance are also disclosed. A nano-size particle optical effect endothermic-technical usage performed in the $W_{18}O_{49}$-based tungsten oxide particles and the new application in the optical technical field thereof are further disclosed.

3 Claims, 5 Drawing Sheets

SLURRY USED FOR A FOOD PACKAGING SUBSTANCE AND METHOD OF PREPARATION INCLUDING THE FOOD PACKAGING STRUCTURE AND SUBSTANCE

FIELD

The disclosure relates to slurry, substance and structure for food packaging, and more particularly to slurry for making a food packaging substance, which includes tungsten oxide particles with average particles of less than 100 nm. The disclosure also relates to a method for preparing the slurry, a food packaging substance that contains the slurry, a method for making the food packaging substance, and a food packaging structure made from the food packaging substance. The inclusion of tungsten oxide particles in the food packaging substance and the structure property of the tungsten oxide particles comply with the limitations of foods contact as indicated in a food contact substance notification (FCN No. 1669) which has been submitted by the inventor and also has been accepted by the U.S. Food and Drug Administration (the USFDA).

BACKGROUND

International publication No. WO 2013/0113330 A2 discloses a liquid formulation that includes compatible components, which are a preform for regular packaging containers.

The liquid formulation includes a carrier that is compatible with polyester and tungsten oxide ($WO_x$) particles dispersed in the carrier. The carrier may be composed of ethylene glycol, vegetable oil, or mineral oil. The formula for the $WO_x$ particles is $WO_{2.72}$. Less than 5 wt. % of the $WO_x$ particles have a particle size of more than 100 μm. In the embodiments of WO 2013/0113330 A2, the $WO_x$ particles are milled to $WO_{2.72}$ particles with mean and median particle sizes of 1.22 μm and 0.97 μm (i.e., 970 nm), respectively.

The preform of a packaging container has a polymer composition, which includes polyethylene terephthalate (PET) and 12 ppm to 50 ppm of $WO_x$ particles. The polymer composition is made from the liquid formulation and components of polyethylene terephthalate (PET), which is subjected to esterification and polycondensation reactions. WO 2013/0113330 A2 did not discuss whether the polymer composition involves chemical activity or has adverse effect caused by the interactions of the liquid formulation, and the compliance of the components with food contact safety for humans.

Packaging containers, such as beverage bottles, are generally prepared from the preform through reheat blow molding. A heat lamp, such as a quartz infrared lamp, reheats the preform. To maximize energy absorption from the lamp and to increase the reheat rate of the preform, the $WO_{2.72}$ particles capable of increasing infrared energy absorption are added to the polymer composition. This process increases the productivity of the packaging container. However, the food contact safety of the packaging container is not discussed in WO 2013/0113330 A2. The haze and transmittance of the preform for the packaging container of WO 2013/0113330 A2 should be developed, and the infrared energy absorption efficiency of the $WO_x$ particles used therein should be enhanced in addition to the uncertainty of food contact safety.

SUMMARY

The disclosure aims to provide a slurry that can alleviate at least one of the drawbacks of the process mentioned above.

According to a first aspect of the disclosure, a slurry for making a food packaging substance includes ethylene glycol, DI water, and $W_{18}O_{49}$-based tungsten oxide substance that have an average small particle size of less than 100 nm. Based on the 100 wt. % of the slurry, the $W_{18}O_{49}$-based tungsten oxide particles have an amount of 18 wt. % to 28 wt. %. This composition is attributed to the fact that the DI water provides a liquid which has a relatively low viscosity, such as an aqueous ethylene glycol solution having a viscosity of 1 of 15 cp., and enables ground objects to achieve an average small particle size of less than 100 nm. Otherwise, a nanoscale range of the average particle size is unachievable with a liquid having high viscosity. Endothermic property toward small particle is considered favorable.

According to a second aspect of the disclosure, a method for preparing a slurry for making a food packaging substance is proposed.

First, ethylene glycol, DI water, and raw $W_{18}O_{49}$-based tungsten oxide material are mixed to form a formulated mixture. The raw $W_{18}O_{49}$-based tungsten oxide particles should have an average particle size greater than 100 nm.

Then, the formulated mixture is ground sequentially using grinding beads with a decreasing particle size at an increasing grinding linear velocity corresponding to the decreasing particle size of the grinding beads to classifiedly form the slurry. The slurry includes the ethylene glycol, DI water, and $W_{18}O_{49}$-based tungsten oxide particles with an average particle size of less than 100 nm.

According to a third aspect of the disclosure, a food packaging substance includes a polyester and $W_{18}O_{49}$-based tungsten oxide particles that have an average particle size of less than 100 nm. The $W_{18}O_{49}$-based tungsten oxide particles have an amount of 0.1 mg to 5 mg based on 100 g of polyester.

As for making the food packaging substance, a composition for preparing a polyester and a slurry is provided. The slurry, which is composed of ethylene glycol, DI water, and $W_{18}O_{49}$-based tungsten oxide particles, should have an average particle size of less than 100 nm. Based on 100 wt. % of the slurry, the $W_{18}O_{49}$-based tungsten oxide particles should have an amount of 18 wt. % to 28 wt. %.

The production stage of polyethylene phthalate (PET) involves esterification and polymerization of the composition.

The slurry is added to the composition during esterification or polymerization to form the food packaging substance. The substance includes the polyester and the $W_{18}O_{49}$-based tungsten oxide particles that should have an average particle size of less than 100 nm. Based on experimental results, embodiments in the line production show no mutual reaction and negative effect. The quality of haziness and transparency of the thus formed food packaging substance are good.

The fourth aspect of the disclosure discloses that a food packaging structure is created by heating a food packaging substance with an infrared light emitter and molding the heated substance. The food packaging substance includes a polyester and $W_{18}O_{49}$-based tungsten oxide particles that have an average particle size of less than 100 nm. 100 g of the polyester and 0.1 mg to 5 mg of the $W_{18}O_{49}$-based tungsten oxide particles are weighed to create a 4 mm-thick preform.

BRIEF DESCRIPTION OF THE DRAWINGS

Other features and advantages of the disclosure will become apparent in the following detailed description of the embodiment with reference to the accompanying drawings.

DETAILED DESCRIPTION

The disclosure shows an embodiment of a slurry for making a food packaging substance, which includes ethylene glycol, water, for example, a deionized (DI) water ( ), and $W_{18}O_{49}$-based tungsten oxide particles with an average particle size of less than 100 nm. Based on 100 wt. % of the slurry, the $W_{18}O_{49}$-based tungsten oxide particles have an amount of 18 wt. % to 28 wt. %.

The amount and particle size of the $W_{18}O_{49}$-based tungsten oxide particles employ the $W_{18}O_{49}$-based tungsten oxide particles to be dispersed suspend in the ethylene glycol and the DI water. Therefore, the DI water can reduce viscosity of the slurry to increase the bead velocity and to refine the ground objects. The ethylene glycol is a part of polyethylene terephthalate (PET) raw material. The hydroxide OH groups of the ethylene glycol capture the $W_{18}O_{49}$-based tungsten oxide particles. Thus, the $W_{18}O_{49}$-based tungsten oxide particles are suspended in the slurry, which can prevent particle sedimentation. Water undergoes esterification process to ensure that resultant side products are compatible with the PET in the process.

This formulation of the slurry can also extend the shelf life of the $W_{18}O_{49}$-based tungsten oxide particles of slurry and improve the process of refining the ground particles in the manufacturing process.

"$D_{50}$ particle size" is the median diameter, where 50% of the volume is composed of particles larger than the stated $D_{50}$ value, and 50% of the volume is composed of particles smaller than the stated $D_{50}$ value. The median particle size is the same as the $D_{50}$ particle size.

Specifically, the $W_{18}O_{49}$-based tungsten oxide particles that are intermixed in the slurry have a $D_{50}$ value of 0.08 μm.

An embodiment of the method for preparing the slurry for making the food packaging includes the following. Ethylene glycol, DI water, and raw bulk $W_{18}O_{49}$-based tungsten oxide that have an average particle size of greater than 100 nm are mixed to form a formulated mixture. The next step involves grinding the formulated mixture with grinding beads that have a decreasing bead size at an increasing grinding linear velocity corresponding to the decreasing particle size of the grinding beads to classifiedly form the slurry, and that can refine the particle size. This composition of the slurry economically forms nanoscale $W_{18}O_{49}$-based tungsten oxide particles.

The formulated mixture should be ground using a number of grinders with various grinding bead sizes to achieve process benefit. A homogenizer not limited to a high pressure homogenizer can also be used. Further details are not provided for the sake of brevity given that the grinders or the homogenizer are not the essential features of the disclosure and are well-known to those skilled in the art. The grinding beads are not limited to zirconium grinding beads. The particle size of the grinding beads may be greater than 0 mm and not greater than 1.2 mm to ensure that the raw $W_{18}O_{49}$-based tungsten oxide particles of the formulated mixture can be ground efficiently to obtain a particle size of less than 100 nm. The desired structure and properties of the $W_{18}O_{49}$-based tungsten oxide particles can be maintained. The linear speed of the grinders in the embodiment ranges from 8 m/s to 14 m/s. The grinding of the formulated mixture is conducted sequentially using grinding beads that have the decreasing particle size of 1.2 to 0.1 mm, suggestion as of 1.2 mm, 0.3 mm, and 0.1 mm at the increasing linear speed of 8 m/s, 11 m/s, and 14 m/s, correspondingly.

To efficiently grind the $W_{18}O_{49}$-based tungsten oxide particles of the formulated mixture, DI water may be added to the formulated mixture to decrease viscosity based on the manufacturing requirements.

An embodiment of a food packaging substance according to the disclosure includes a polyester and $W_{18}O_{49}$-based tungsten oxide particles that have an average particle size of less than 100 nm. Based on 100 g of the polyester, the $W_{18}O_{49}$-based tungsten oxide particles have an amount of 0.1 mg to 5 mg. The polyester may be PET.

The food packaging substance is transparent and colorless and can select absorption of near infrared (NIR) light. Thus, when the food packaging substance is used as a preform for making a food packaging structure, it should have a relatively high endothermic efficiency to save energy and to achieve excellent performance.

The $W_{18}O_{49}$-based tungsten oxide particles with a predetermined particle size can exhibit a maximum absorbance peak in a particular wavelength region of the NIR light emitted by a quartz lamp emitter, that is, to have nano-size particle optical effect phenomenon. The absorbance peak of the $W_{18}O_{49}$-based tungsten oxide particles under the optical nano-size particle effect will have one to five times higher endothermic effect than that of the regularly sized larger tungsten oxide particles used for conventional food packaging substances in the same NIR wavelength region.

In this embodiment, the $W_{18}O_{49}$-based tungsten oxide particles of the food packaging substance have a $D_{50}$ value of 0.08 μm, and an absorbance peak at the NIR wavelength that ranges from 1150 nm to 1200 nm, which is offset from the absorbance peak of the PET at the NIR wavelength of 1660 nm. Equalization of outside and inside of the skin portion of the preform must be performed to effectively conduct an endothermic process of the preform tube. This process confirms that the use of the endothermic process by the optical nano-size particle effect in the $W_{18}O_{49}$-based tungsten oxide particles is a new application in optical technical studies.

The inclusion of the $W_{18}O_{49}$-based tungsten oxide particles in the food packaging substance complies with the limitations as indicated in a food contact substrate notification (FCN No. 1669) that is accepted by the US Food and Drug Administration (USFDA).

The $W_{18}O_{49}$-based tungsten oxide particles in the slurry or the food packaging substance of the disclosure include $W_{18}O_{49}$, which is a food contact substance recognized by the USFDA through the submission review FCN No. 1669. The submission of FCN requires information concerning chemical and physical stability, including stability in water, acid, and alkaline solutions, and information concerning impurities and physical/chemical properties, poly-reactions and specifications, intended use and technical effect, migrations levels in food, and estimated daily intake. Information concerning safety narrative (SN) and comprehensive toxicological profile (CTO) about the food packaging substance are also required, such as human exposure and potential toxicity, mutagenic and carcinogenic potential, and in vivo toxicity tests. The FCNs are only effective for the listed manufacturer and its customers. Other manufacturers must submit their own FCN for the same food contact substance and intended use.

In the embodiment of the food packaging substance, the small particle exhibits the optical nano-size particle effect, considering that the average particle size of the $W_{18}O_{49}$-based tungsten oxide particles is less than 100 nm. Thus, when the quartz lamp-emitted light wave of the NIR wavelength having a peak at approximately 1200 nm enters the $W_{18}O_{49}$-based tungsten oxide particles, the light wave of the NIR wavelength corresponding to the size of the $W_{18}O_{49}$-based tungsten oxide particles has a repeating internal total reflection phenomenon, which will take place in the $W_{18}O_{49}$-based tungsten oxide particles. The NIR light wave will be converted to heat energy with an increased absorption of light. Therefore, an inner and an outer skin portion of the food packaging structure preform should have a food packaging substance that contains $W_{18}O_{49}$-based tungsten oxide particles, which can absorb the NIR light wave, so as to be heated evenly. In the embodiment, the $W_{18}O_{49}$-based tungsten oxide particles are porous. Thus, the polyester may enter pores, which are linked together in the $W_{18}O_{49}$-based tungsten oxide particles. Therefore, the $W_{18}O_{49}$-based tungsten oxide particles can be prevented from migrating into foods.

Hence, according to the experimental results, the food packaging substance complies with the food contact safety that is accepted by the USFDA. Moreover, the PET food packaging structure preform can absorb a wave light of 1200 nm through the optical nano-size particle effect of the $W_{18}O_{49}$-based tungsten oxide particles. Since PET causes absorption of the NIR light wave of 1660 nm, the outer skin portion of the preform can be overheated, but the inner skin portion of the preform remains cool enough to cause a blow molding effect. However, the $W_{18}O_{49}$-based tungsten oxide particles can absorb the NIR light of around 1200 nm. Therefore, the outer and inner skin portions of the food packaging structure preform can be heated evenly to display a good quality.

An embodiment of the method for making the food packaging substance according to the disclosure includes the following processes: providing a composition for preparing a polyester and the abovementioned slurry; conducting esterification and polymerization of the composition; and adding the slurry to the composition during one of the esterification and polymerization processes of the composition to form the food packaging substance, including the polyester and the $W_{18}O_{49}$-based tungsten oxide particles of the slurry with an average particle size of less than 100 nm. The slurry is added during the polymerization of the composition. In the embodiment, the polyester is PET and the composition includes terephthalic acid (TPA) and ethylene glycol which originally serve as the PET raw materials.

The reaction condition toward the esterification and polymerization of the composition are controlled based on the polyester process. The esterification of the composition may be conducted at a temperature of 210° C. to 270° C., and the polymerization of the composition may be conducted under at a temperature of 260° C. to 290° C., with an operation pressure of not greater than 250 mmHg. A polymerization catalyst may be further added to the composition and may be selected from the group consisting of antimony trioxide ($Sb_2O_3$), phosphoric acid stabilizer, antimony acetate, germanium oxide, titanium, catalyst, and combinations thereof.

When the slurry is added to the composition during polymerization, the $W_{18}O_{49}$-based tungsten oxide particles, the ethylene glycol, and the DI water of the slurry are included thereto with no problem being observed.

An embodiment of a food packaging structure is made by heating the abovementioned food packaging substance with an infrared emitter and molding the heated food packaging substance.

The finished PET food packaging structure article has a relatively significant transmittance and a low haze and cannot be easily cracked. The $W_{18}O_{49}$-based tungsten oxide particles are not easily separated from the food packaging structure. In this embodiment, the migration of the tungsten ions from the food package structure is measured according to FDA 177.1630 method, which involves boiling extraction with an inductively coupled plasma (ICP) measurement. Results show that when a concentration of the tungsten oxide particles is 50 ppm based on 40 g of PET, a total of only 0.05 ppb of the tungsten ions migrate into water of 1000 g. This level is lower than the limitation of 0.5 ppb prescribed by FDA 21 FCR 10.115. The concentration of the migrated $W_{18}O_{49}$-based tungsten ions in the water is not only lower than 3.32 ppb of the $W_{18}O_{49}$-based tungsten oxide ion concentration of drinking tap water but also lower than 10 ppb of the $W_{18}O_{49}$-based tungsten oxide ion concentration of well water. Therefore, the food packaging structure of this disclosure is safe for food contact use.

The food packaging structure is not limited to food container or food contact sheet. The food container may be a drinking bottle, such as a jar or a bottle for carbonated beverage. The food contact sheet may be a food wrapping paper.

The color temperature of the infrared emitter at 2050° C. may correspond to the main near-infrared radiation wavelength of 1250 nm, and the wavelength of the infrared emitter in an infrared quartz tube lamp can be adjusted and not restricted. However, long-term use of low temperature wavelength is not good for production. In the molding step, the food packaging substance is molded with a mold shape of the mold is based on the actual requirement. Considering that the $W_{18}O_{49}$-based tungsten oxide particles are included in the food packaging substance and exhibits the optical nano-size particle effect, the food packaging substance therefore, can absorb multiple NIR light.

Therefore, the food packaging substance can be heated rapidly and evenly, enabling energy-efficient production.

EXAMPLES

Example 1: Preparation of a Food Packaging Structure

Preparation of Composition 1500 g of ethylene glycol, 10500 g of DI water, and 3000 g of $W_{18}O_{49}$ particles with a bulk particle size of 25 μm were mixed to form a formulated mixture. The formulated mixture was then ground by a first grinder (Model No. LMJ20, available from Asada Co., Japan) using zirconium beads that have a particle size of 1.2 mm, at a linear velocity of 8 m/s. This process refines the bulk material of the raw $W_{18}O_{49}$ particles to the particle size of 0.6 μm. The formulated mixture was then transferred from the first grinder to a second grinder (Model No. SC220, available from Mitsui Mining Co., Ltd., Taiwan) and then ground by the second grinder using small grinding beads that have a particle size of 0.3 mm at a linear velocity of up to 11 m/s to further refine the $W_{18}O_{49}$-based tungsten oxide particles to a particle size of 0.2 μm. The formulated mixture was then transferred from the second grinder to a third grinder (Model No. Nano-M2, available from Mitsui Mining Co., Ltd., Japan). The third grinder used grinding zirconium beads that have a small particle size of 0.1 mm, at a linear velocity of up to 14 m/s, to form the slurry and the $W_{18}O_{49}$ particles with the final particle size of 80 nm. Based on 100 wt. % of the slurry, the DI water, the ethylene glycol, and the $W_{18}O_{49}$ particles have an amount of 70 wt. %, 10 wt. %, and 20 wt. %, respectively. To meet the food contact safety requirement, no dispersant was added while preparing the slurry.

Preparation of Food Packaging Substance from the Slurry

A composition for preparing polyester, including 38 kg of terephthalic acid (TPA), 900 g of isophthalic acid (IPA), and 18.16 kg of the abovementioned slurry, was first introduced into a mixer and an autoclave. Then, esterification of the composition was conducted at a temperature of 250° C. for 6.5 hours to form a pre-treated mixture that has an esterification degree of 95%. The pre-treated mixture was then subjected to a first condensation polymerization at a temperature of 250° C. under a pressure of 100 mmHg. Meanwhile, 230 ppm of antimony trioxide based on an amount of polyethylene terephthalate and 35 ppm of a phosphoric acid stabilizer based on an amount of polyethylene terephthalate were added to the pre-treated mixture. The pre-treated mixture was then subjected to a second condensation polymerization at a temperature of 250° C. to 290° C. and under a pressure less than 1 mmHg to form a preformed food packaging substance. The preformed food packaging substance was introduced into a pump and was extruded and cooled by cooling water. The preformed food packaging substance was then granulated by a granulator to form wet chips of 50 kg. Finally, solid polymerization of the wet chips was conducted at 200° C. to form the food packaging substance with a viscosity that ranged from 0.72 dL/g to 0.88 dL/g. Based on the amount of 1.00002 kg of the food packaging substance, PET has an amount of 1 kg and the $W_{18}O_{49}$ particles have an amount of 0.02 g. The $W_{18}O_4$ particles are inert. Thus, they do not react with other substances to form harmful products. Therefore, the food packaging substance has an enhanced viscosity and includes a decreased amount of low molecular weight of oligomers which are harmful to food safety.

Preparation of the Food Packaging Structure

The food packaging substance underwent drying in a dehumidification unit and then processed in a mold of an injection molding machine (available from Husky Injection Molding Systems Ltd.). The food packaging substance was melted by the injection molding machine and then molded to form a preform of a food packaging structure using injection molding techniques. The preform was then subjected to a cooling treatment with a thickness of approximately 4 mm.

Thereafter, the preform is heated by an infrared quartz lamp system that has a main NIR radiation wavelength of approximately 1250 nm (available from Sidel Packaging Systems South Africa [Pty.] Ltd.) for 0.5 minute to ensure that the preform was heated up to a glass transition temperature (Tg point). Finally, the heated preform was subjected to a blow molding treatment to form a food container with a thickness of 0.35 mm.

Example 2: Preparation of a Food Packaging Structure

The slurry, the food packaging substance and structure in Example 2 are prepared in a manner similar to that of Example 1. However, the food packaging substance prepared in Example 2 includes 2 kg of PET and 0.04 g of $W_{18}O_{49}$ particles that have a particle size of 80 nm.

Comparative Example 1

Preparation of the food packaging substance and structure in Comparative Example 1 is similar to that of Example 1. However, the food packaging substance or structure of Comparative Example 1 is free of the slurry.

Comparative Example 2

3 kg of $W_{18}O_{49}$ particles with a particle size of 25 μm, 10.5 kg of DI water, and 1.5 kg of ethylene glycol were first placed in a first grinder (Model No. LMJ20, available from Asada Co., Japan) and ground with grinding zirconium beads that have a particle size of 1.2 mm, at a linear speed of 8 m/s. This process formed a formulated mixture, which include $W_{18}O_{49}$ particles with a particle size of 0.6 μm. The formulated mixture was then moved from the first grinder to a second grinder (Model No. SC220, available from Mitsui Mining Co., Ltd., Japan), and then ground by the formulated mixture using grinding zirconium beads with a particle size of 0.3 mm, at a linear speed of 11 m/s. This process formed the slurry, which includes $W_{18}O_{49}$ particles with a $D_{50}$ value of 0.2 μm. Based on 100 wt. % of the slurry, the DI water has an amount of 70 wt. %, the ethylene glycol has an amount of 10 wt. %, and the $W_{18}O_{49}$ particles have an amount of 20 wt. %.

The slurry in Comparative Example 2 was applied to making the food packaging substance and the structure in a manner similar to that in Example 1.

Comparative Example 3

3 kg of $W_{18}O_{49}$ particles with a particle size of 25 μm, 10.5 kg of DI water, and 1.5 kg of ethylene glycol were first placed in a grinder (Model No. SC220, available from Mitsui Mining Co., Ltd., Japan) and ground with grinding zirconium beads with a particle size of 1.2 mm at a tangential speed of 8 m/s, to form a slurry with a $D_{50}$ value of 0.6 μm. Based on 100 wt. % of the slurry, the DI water has an amount of 70 wt. %, the ethylene glycol has an amount of 10 wt. %, and the $W_{18}O_{49}$ particles have an amount of, 20 wt. %.

The slurry in Comparative Example 3 was applied to making the food packaging substance and the structure in a manner similar to that of Example 1.

Property Determination and Evaluation

Particle size distribution ($D_{50}$ particle size): The $D_{50}$ values of the $W_{18}O_{49}$ particles in the food packaging structures of Examples 1 to 2 and Comparative Example 1 were measured with a particle size analyzer (Model No. Mastersizer 2000, available from Malvern Instruments Ltd.).

Figure 2:
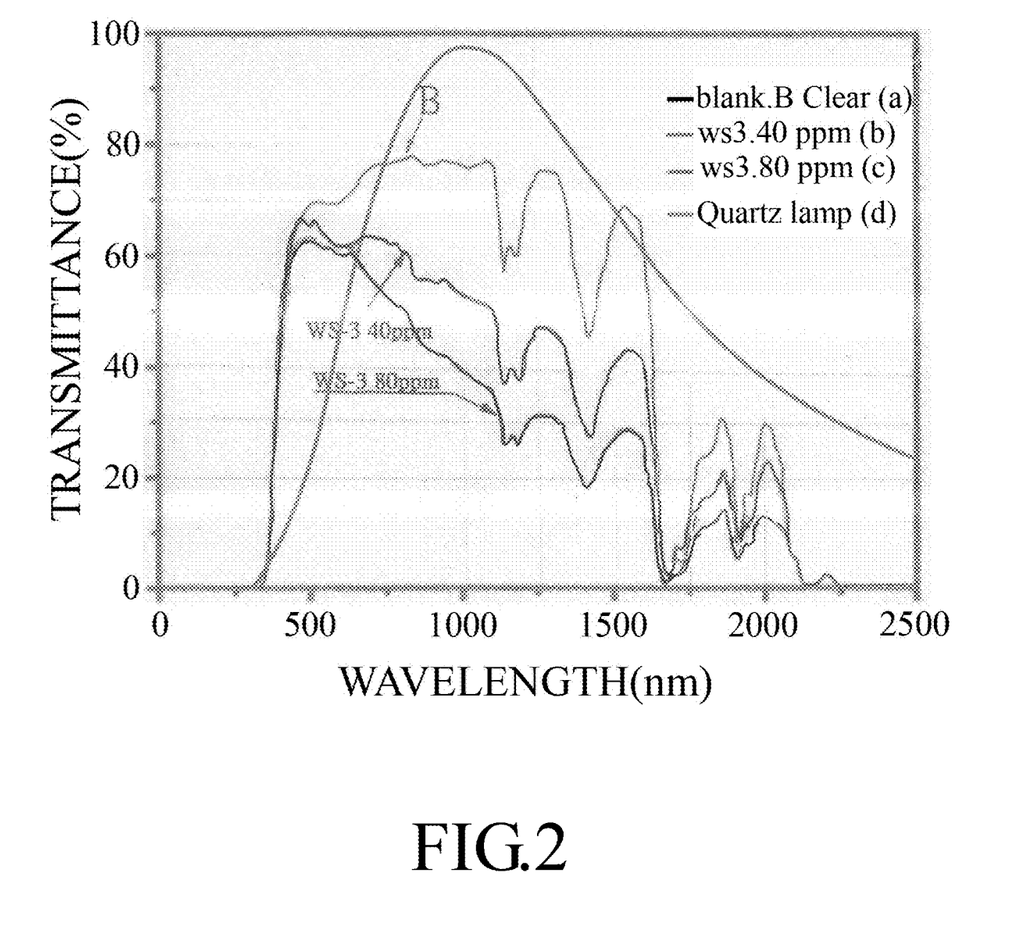
FIG. 2 shows a plot of transmittance versus wavelength, which illustrates near-infrared absorption spectra of a comparative PET and food packaging structure preforms according to the disclosure.
Figure 3:
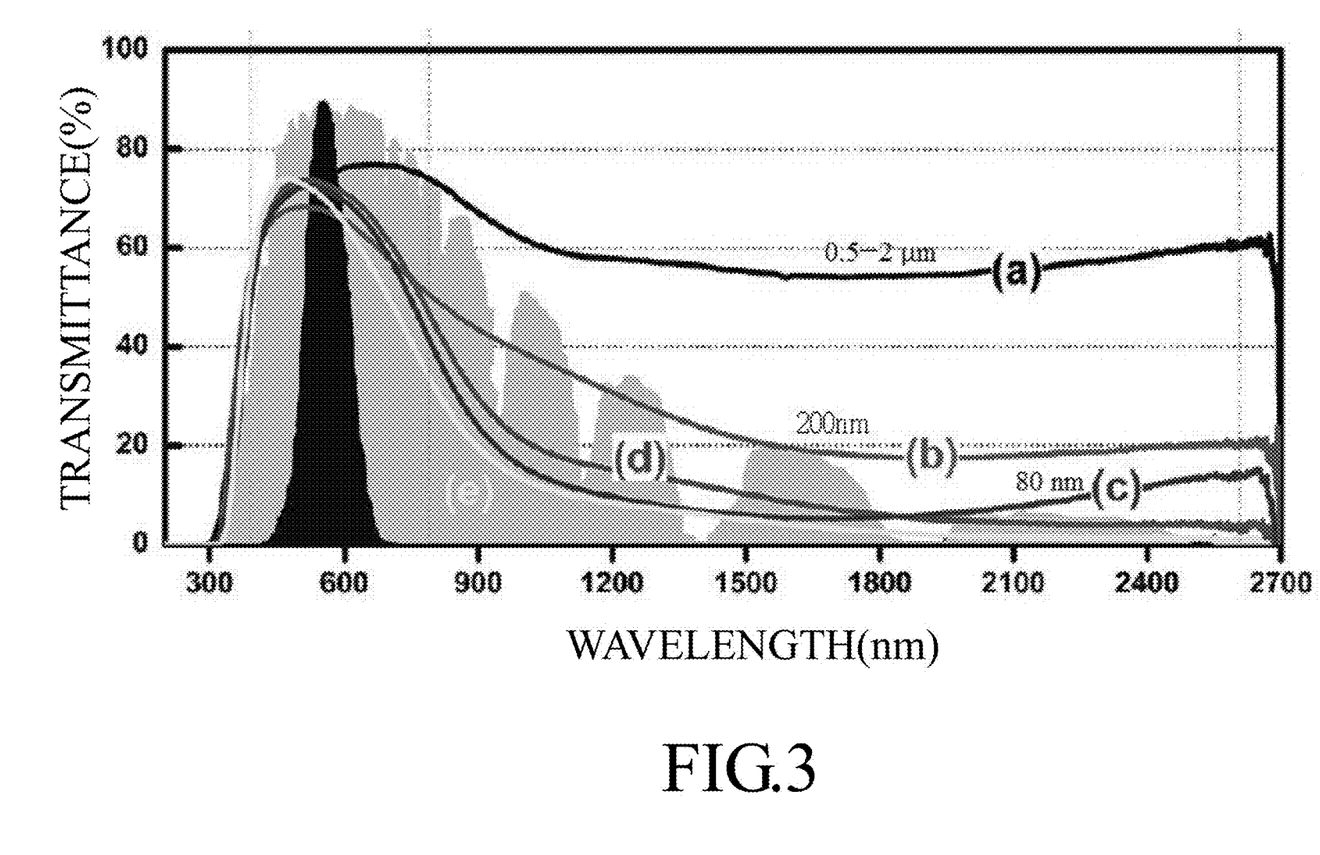
FIG. 3 shows a plot of transmittance versus wavelength, which illustrates the near-infrared absorption spectra of $W_{18}O_{49}$-based tungsten oxide particles same quantity with different particle sizes.
Figure 4:
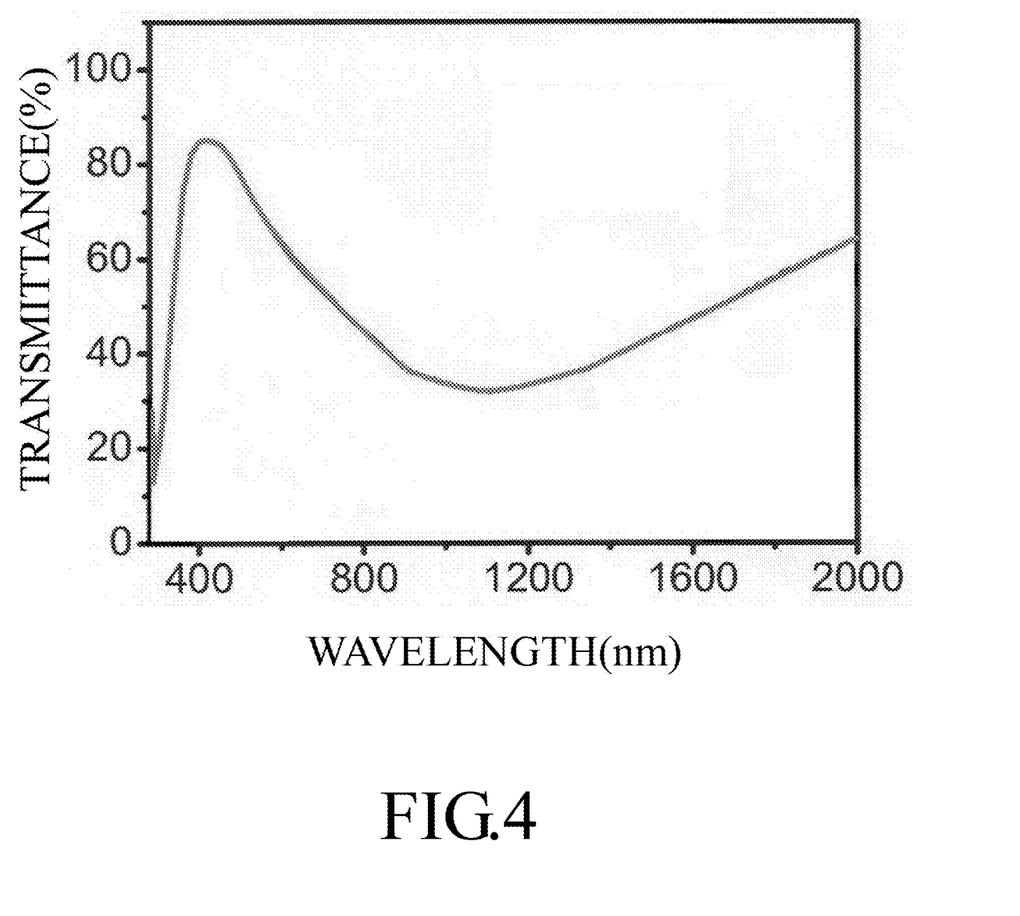
FIG. 4 shows a plot of transmittance versus wavelength, which illustrates the near-infrared absorption spectrum of a slurry in Example 1 of the disclosure.

Transmittance: Transmittance of the $W_{18}O_{49}$ particles with different particle sizes (as shown in FIG. 3), the composition of Example 1 (as shown in FIG. 4), and the preform of the food packaging structure of Example 2 and Comparative Example 1 (as shown in FIG. 2) were measured with a spectrophotometer (Model No. UV-2600, available from SHIMADZU Co.). When transmittance of each preform of Example 2 and Comparative Example 1 was measured, light emitting from one side of the preform would be received on its opposite side. The preform has a thickness of 8 mm.

L*, a*, and b*: L*, a*, and b* are color scales based on the CIE 1976 system. L* axis represents lightness that ranged from 0-100, a* axis represents the red-green direction (positive and negative values stand for red and green, respectively), and b* axis represents the yellow-blue direction (positive and negative values stand for yellow and blue, respectively). L*, a*, and b* of the preform of Examples 1 and 2 and Comparative Example 1 were measured with a spectrophotometer (Model No. Color Eye 2145, available from Gretag Macbeth Ltd.). The viewing angle was 2°. Each preform in Examples 1 and 2 and Comparative Example 1 has a thickness of 4 mm.

Haze: Haze of the preform in Examples 1 and 2 and Comparative Example 1 was measured with a spectrophotometer (Model No. NDH 2000N, available from NIPPON DENSHOKU INDUSTRIES CO., Ltd.), according to method ASTM-D1003. The haziness is $(T_d/T_t)/100$, wherein $T_d$ and $T_t$ represent a diffusion value and a total transmittance, respectively.

Temperature: Temperature of the heated preform in Examples 1 and 2 and Comparative Example 1 was measured by heating the preform with the infrared quartz tube and measuring the temperature of the heated preforms with a thermometer.

L*, a*, and b* values and the temperature of the preforms in Examples 1 and 2 and Comparative Example 1 are shown in Table 1.

TABLE 1

| Preform | Example 1 | Example 2 | Comparative Example 1 |
| --- | --- | --- | --- |
| L* | 64.26 | 67.5 | 70.76 |
| a* | −1.932 | −0.9 | −0.194 |
| b* | −2.39 | 0 | 2.12 |
| Haze (%) | 37.06 | 37.53 | 38.01 |
| Temperature(° C.) | 150 | 132 | 110 |

The results in Table 1 indicate that the preform produced by the disclosure can absorb relatively significant heat emitted from the NIR given that the heated preform produced from the Examples 1 and 2 have higher temperature than that of Comparative Example 1. The temperature of heated preform of Example 1 is increased by 22° C., whereas the temperature of the heated preform of Example 2 is increased by 40° C. In other words, compared with a room temperature of 25° C., the heat increases at a rate of the preform produced in Examples 1 and 2 are 25.9% and 47%, respectively. Moreover, the haze of each preform of Examples 1 and 2 is lower than that of the preform produced in Comparative Example 1. This finding means that the transmittance of the preforms produced from the composition of Examples 1 and 2 may be relatively high.

To compare the results of the preforms in this disclosure with the results of the conventional preform disclosed in US Patent Application Publication No. 2015/0110982 A1, the particle sizes of the conventional tungsten oxide particles included in the preforms are listed in Table 2. Table 3 shows L*, a*, and b* of the color scale in the conventional preforms, and the temperature of the heated preforms disclosed in US Patent Application Publication No. 2015/0110982 A1. Results show that the increase in the surface temperature of the conventional preforms, that include the 25 ppm of the milled $WO_{2.72}$ particles, is about 15.76° C. (the inside of the conventional preform should be lower), and is only approximately half of that compared to this disclosure.

TABLE 2

| Sample | Particle size(μm) | Particle size distribution (D50)(μm) |
| --- | --- | --- |
| Un-milled $WO_{2.72}$ | 5.98 | 4.04 |
| Milled $WO_{2.72}$ | 1.22 | 0.97 |
| Un-milled $WO_{2.9}$ | 9.91 | 7.23 |
| Milled $WO_{2.9}$ | 2.40 | 1.89 |

TABLE 3

| Composition | L* | a* | b* | Improvement in Reheated Temperature | L* Reduction |
| --- | --- | --- | --- | --- | --- |
| C93 Control | 81.57 | −0.17 | 1.70 | N/A | N/A |
| 25 ppm un-milled $WO_{2.72}$ | 78.81 | −1.51 | 1.81 | 9.36 | 2.75 |
| 25 ppm un-milled $WO_{2.9}$ | 80.25 | −0.61 | 2.28 | 5.56 | 1.31 |
| 25 ppm milled $WO_{2.72}$ | 78.02 | −1.76 | 0.26 | 15.76 | 3.55 |
| 25 ppm milled $WO_{2.9}$ | 80.66 | −0.63 | 2.09 | 4.48 | 0.91 |
| 6 ppm U1 carbon black | 74.73 | 0.16 | 3.05 | 7.7 | 6.83 |
| 6 ppm Tin | 73.51 | −0.70 | −0.28 | 10.16 | 8.06 |

Figure 1:
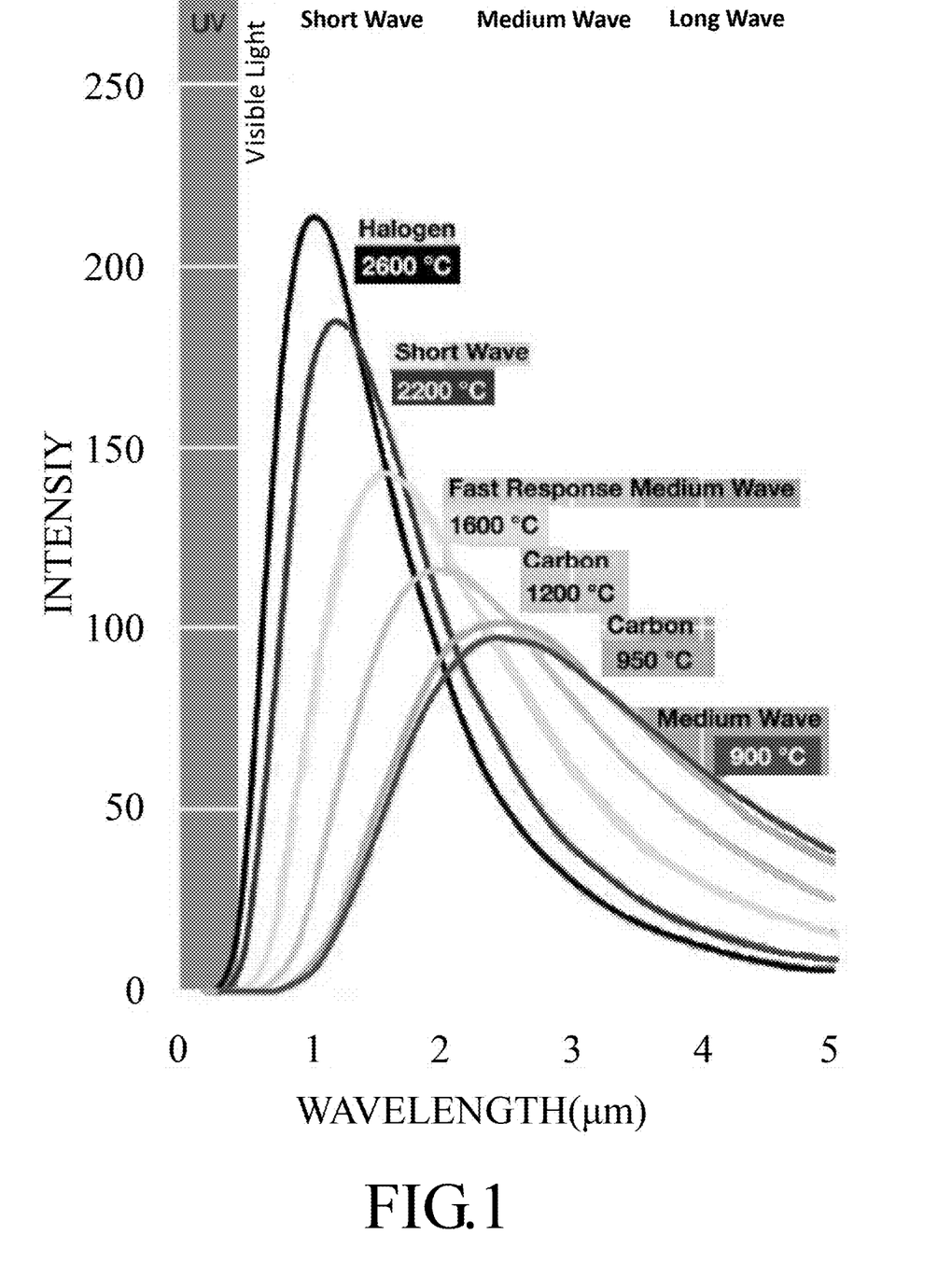
FIG. 1 shows a plot of intensity versus wavelength, which illustrates spectra of various conventional infrared emitters.

FIG. 1 shows a plot of intensity versus wavelength and illustrates the spectra of various conventional infrared lamps, which may be considered to serve as the NIR light emitter for preparing the food packaging structure of this disclosure.

In FIG. 2, a curve (a) illustrates transmittance of a preform of the food packaging structure obtained from Comparative Example 1. A curve (b) illustrates the transmittance of a preform of the food packaging structure obtained from the composition of Example 2. A curve (c) illustrates the transmittance of a preform of the food packaging structure made in a manner similar to that of Example 2, except that the $W_{18}O_{49}$ particles have a concentration of 80 ppm. A curve (D) illustrates a light energy distribution emitted from a quartz tube. The curve (b) has a relatively high absorption at a NIR wavelength of 1660 nm, which shows that the preform that is free of the $W_{18}O_{49}$ particles has a relatively significant heat absorption. However, 27.5% of the infrared light are absorbed by an outer portion of the preform, which is one-eighth thickness of the preform and has a depth of 0.5 mm, and is separated from an outer surface of the preform that resulted from overheating. By contrast, 5.85% of the infrared are absorbed by an inner portion of the preform that has one-eighth of the preform thickness, causing the inner portion to be cold. These results indicate that the preform produced from the composition of Comparative Example 1, which is free of the $W_{18}O_{49}$ particles, has a problem of uneven heating.

FIG. 3 shows a plot of transmittance of $W_{18}O_{49}$ particles with different particle sizes at similar light wavelengths. Curves (a), (b) and (c) illustrate transmittance of $W_{18}O_{49}$ particles with particle sizes of 0.5 μm to 2 μm, transmittance of $W_{18}O_{49}$ particles having a particle size of 200 mm, and transmittance of $W_{18}O_{49}$ particles having a particle size of 80 nm, respectively. A curve (d) illustrates transmittance of the $W_{18}O_{49}$ particles, where each particle is shaped like a needle with an area size of 60 nm×10 nm. The curve (d) also illustrates transmittance of $W_{18}O_{49}$ particles, each of which is shaped like a needle and have an area size of 40 nm×7 nm. The results shows that the transmittance of the $W_{18}O_{49}$ particles that have a particle size of 80 nm is 8.3% at a wavelength of 1350 nm, whereas the transmittance of the $W_{18}O_{49}$ particles having a particle size of 0.5 μm to 2 μm is 56.6% at a wavelength of 1350 nm. Hence, an absorbance degree of the $W_{18}O_{49}$ particles having particle size of 80 nm is 1.081, (calculated from $\log_{10}0.083$) and an absorbance degree of the $W_{18}O_{49}$ particles having a particle size of 0.5 μm to 2 μm is 0.247 (calculated from $\log_{10}0.566$), according to Beer-Lambert's law. Therefore, the calculated absorbance of the $W_{18}O_{49}$ particles with a particle size of 80 nm is 4.37 times higher than that of the $W_{18}O_{49}$ particles with a particle size of 0.5 μm to 2 μm. This finding shows that heat absorption of the $W_{18}O_{49}$-based tungsten oxide particles having a particle size of 80 nm is 4.37 times higher than that of the $W_{18}O_{49}$ particles with a particle size of 0.5 μm to 2 μm. Results prove that the absorbance of the $W_{18}O_{49}$ particles with a particular nanoscale particle size at NIR is 3 to 5 times higher than that of the $W_{18}O_{49}$ particles with larger particle size. In addition, the classification of sequential grinding steps in the method of preparing the composition of the disclosure can reduce manufacturing cost.

FIG. 4 illustrates the transmittance of the food packaging substance obtained from the diagram of Example 1. The curve has a concave around the light wavelength of 1150 nm represents the optical nano-size particle effect of the $W_{18}O_{49}$ particles' strong absorption. Hence, NIR light wavelength that ranges from 700 nm to 1600 nm can be absorbed by the $W_{18}O_{49}$ particles of the composition in this disclosure. The preform of the food packaging structure can be heated evenly, and the uneven heating problem of the preform encountered in Comparative Example 1 can be alleviated.

During the subsequent blowing process, the preform of this disclosure does not easily crack, which may be a result from the absence of uneven heating and stretching of the crystallized or cold PET, as shown by the preform obtained from Comparative Example 1.

Figure 5:
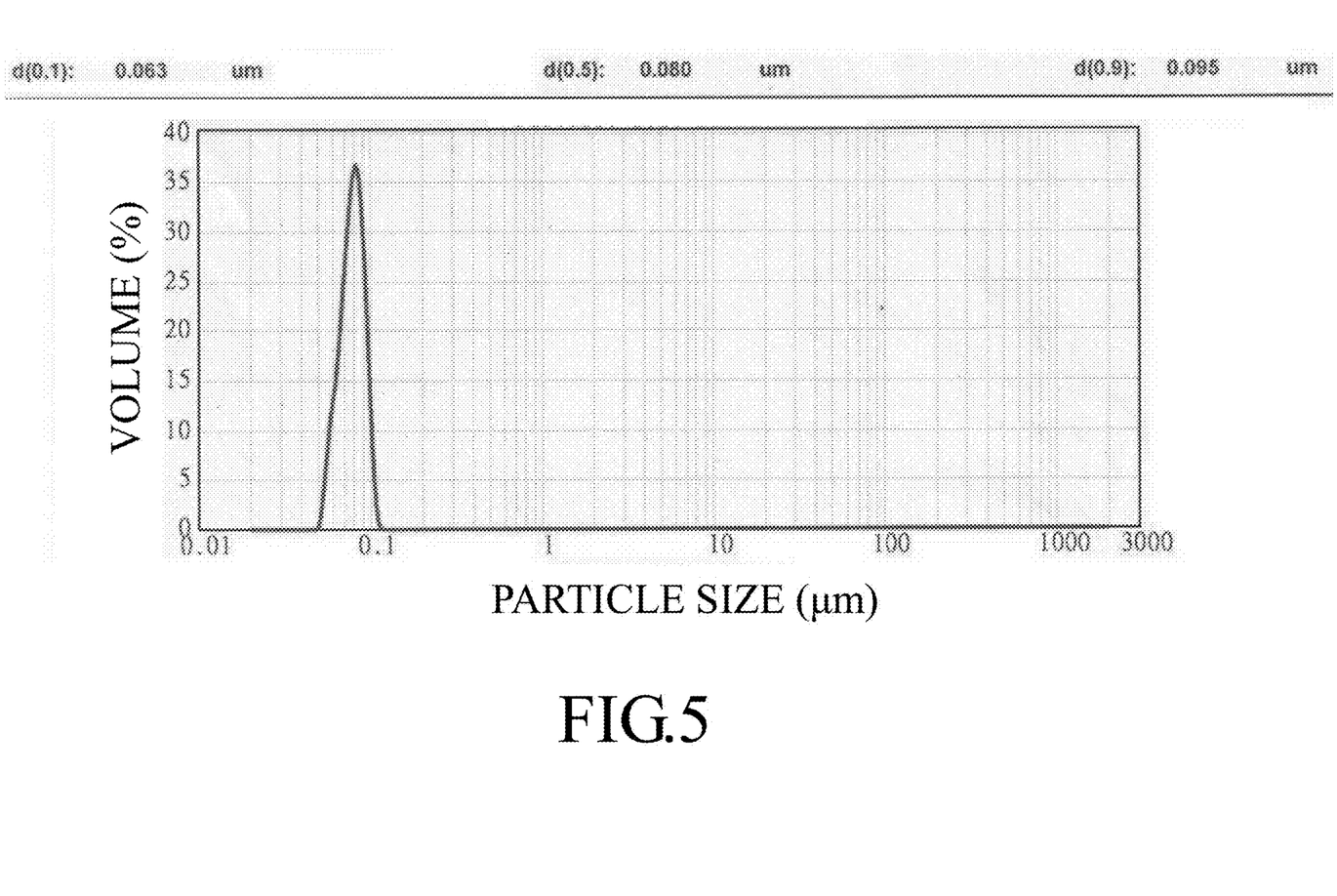
FIG. 5 shows a plot of volume versus particle size, which illustrates particle size distribution of $W_{18}O_{49}$-based tungsten oxide particles from the slurry in Example 1 of the disclosure.

FIG. 5 shows a plot of the particle size distribution of the $W_{18}O_{49}$-based tungsten oxide particles of the composition of Example 1. Particle size distribution was measured using laser techniques. Result shows that the particle size of the $W_{18}O_{49}$-based tungsten oxide particles is concentrated in a region of less than 100 nm.

The $W_{18}O_{49}$ particles used in Examples 1 and 2 of this disclosure have a CAS Registry Number of CAS Reg. No. 12037-57-9 that is assigned by the Chemical Abstracts Service (CAS). In 1985, YOUS, ROBIN, and ROBIN et al., and DONNADIEU et al. also disclosed the $W_{18}O_{49}$ particles of the study on The Solid Films 130 (1985). The $W_{18}O_{49}$-based tungsten oxide particles have been used in glass thermal paper for heat absorption in an infrared wavelength region. However, in this disclosure, the applicants use the $W_{18}O_{49}$-based tungsten oxide substance in for food packaging.

The $W_{18}O_{49}$-based tungsten oxide particles are well dispersed in the slurry by controlling the particle size of the tungsten oxide particles and the formulation design of the slurry for making the food packaging substance. The process cannot be easily achieved without precipitating the slurry. The food packaging substance has a relatively significant absorbance at NIR light wavelength ranging from 700 nm to 1600 nm, especially at a light wavelength of 1150 nm. Considering that the $W_{18}O_{49}$-based tungsten oxide particles have a relatively small particle size, the food packaging structure made from the food packaging substance has a relatively great transmittance and a relatively low haziness. Furthermore, the preform produced from the slurry of this disclosure can be evenly heated, and crystallization of the PET in the preform can be alleviated to prevent the food package structure from cracking, which is useful in the manufacturing of soft drink bottles and the like.

A nano-size particle optical effect endothermic-technical usage performed in $W_{18}O_{49}$ tungsten oxide is a particular application in the optical technical field.

In the description above, numerous details have been set forth to provide a thorough understanding of the embodiment(s). However, one or more other embodiments may be practiced without these details. Notably, the reference throughout this specification of "one embodiment" or "an embodiment," with an indication of an ordinal number means that a particular feature, structure, or characteristic may be included in the practice of the disclosure. Moreover, various features in the description are sometimes grouped together in a single embodiment, figure, or description to streamline the disclosure and aid in the understanding of various inventive aspects. This finding means that one or more features or details from one embodiment may be practiced together with one or more features or details from another embodiment, where appropriate, in the practice of the disclosure.

This disclosure was described in connection with what is considered an exemplary embodiment. This disclosure is not limited to the disclosed embodiment but is intended to cover various arrangements included within the spirit and scope of the broadest interpretation to encompass such modifications and equivalent arrangements.

What is claimed is:

1. A method of making a food packaging substance, comprising:

providing a composition for preparing a polyester and a slurry, wherein the slurry includes ethylene glycol, DI water, and $W_{18}O_{49}$-based tungsten oxide particles that have an average particle size of less than 100 nm, and wherein, based on 100 wt. % of the slurry, the $W_{18}O_{49}$-based tungsten oxide particles containing an amount of 18 wt. % to 28 wt. %, conducting esterification and polymerization of the composition, and adding the slurry to the composition during one of the esterification and polymerization of the composition, wherein the step of adding the slurry forms the food packaging substance that includes the polyester and the $W_{18}O_{49}$-based tungsten oxide particles with an average particle size of less than 100 nm.

2. The method of claim 1, wherein the $W_{18}O_{49}$-based tungsten oxide particles are $W_{18}O_{49}$ particles.

3. The method of claim 1, wherein the slurry is added to the composition during the polymerization of the composition so that the $W_{18}O_{49}$-based tungsten oxide particles, the ethylene glycol, and the DI water are included in the polymerization of the composition.

* * * * *